United States Patent [19]

Shimizu

[11] Patent Number: 4,602,169
[45] Date of Patent: Jul. 22, 1986

[54] SIGNAL COMPARING CIRCUIT

[75] Inventor: Yoshio Shimizu, Yokohama, Japan

[73] Assignee: Sony Corporation, Tokyo, Japan

[21] Appl. No.: 489,525

[22] Filed: Apr. 28, 1983

[30] Foreign Application Priority Data

Apr. 28, 1982 [JP] Japan ................................. 57-70480
Jul. 30, 1982 [JP] Japan ................................ 57-134125

[51] Int. Cl.$^4$ .............................................. H03K 5/24
[52] U.S. Cl. ..................... 307/359; 307/355; 307/362; 455/134
[58] Field of Search ............... 307/359, 362, 290, 355, 307/356; 328/146, 147; 455/132, 134

[56] References Cited

U.S. PATENT DOCUMENTS

3,628,059 12/1971 Niu ...................................... 307/359
4,384,219 5/1983 Davis ................................... 307/359

*Primary Examiner*—John Zazworsky
*Attorney, Agent, or Firm*—Lewis H. Eslinger; Alvin Sinderbrand

[57] ABSTRACT

A signal comparing circuit includes a differential amplifier in which first and second amplifier input signals derived from respective circuit input signals are compared with each other to provide an output signal the level of which depends on the relative levels of the amplifier input signals, and the signal comparing circuit has a hysteresis width, which is defined as a range of relative levels of the input signals within which the output signal level does not change. A variable gain attenuator circuit is connected to the differential amplifier at an input thereof and includes a switching circuit that changes the circuit gain in response to changes in the output signal level. The attenuator circuit gain changes so that at least one amplifier input signal is provided at two levels, with the difference between such two levels depending on the level of at least one of the circuit inputs. The attenuator circuit thus varies the hysteresis width in response to said at least one circuit input signal level.

10 Claims, 11 Drawing Figures

SIGNAL COMPARING CIRCUIT

BACKGROUND OF THE INVENTION

1. Field of the Invention

This invention relates to a signal comparing circuit and, more particularly, to a signal comparing circuit having a hysteresis circuit.

2. Description of the Prior Art

When a signal in the very high frequency band, such as an FM radio or a VHF television signal, is received by a receiver in a car, the signal's short wavelength and almost complete lack of a ground wave can cause a sudden decrease in signal strength if the vehicle is moved into a fringe area. The decrease in the strength of the signal received can be caused directly by a decrease in the strength of the available signal or by multipath interference. A decrease in signal strength causes deterioration in tone quality in radio signals (a problem particularly in stereo broadcasts) and deterioration in the picture quality in TV signals (causing snow, ghosts, synchronization disturbances, etc.).

A fringe area is typically one in which the signal strength is below 60 dB/m. When the receiver is moving, such as with a car, houses, metal poles, etc., along the road, multipath interference and fluctuations in signal strength occur through a range of ±20 dB/m. However, in those circumstances signal strength can also go as low as about 20 dB/m, which results in distortion in an FM stereo broadcast and disturbances in picture synchronization in a television broadcast.

To remove such defects, a so-called "diversity receiver" has been proposed in which two antennas are fixed to the vehicle. The antenna inputs are compared and the higher input signal level is detected and fed to the receiver. However, signals can be subject to momentary level fluctuations by, for example, residual AM-components or noise contained in the received signal. Because of such momentary fluctuations, the output of the detection circuit in the diversity receiver is frequently switched. Such frequent switchings can, in FM stereo broadcasts, cause audible switching noise and, in television broadcasts, that switching "noise" can also disturb the synchronization of the picture.

Figure 1:
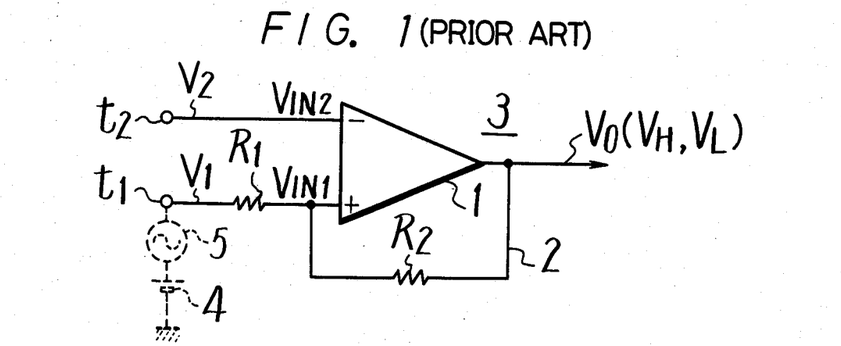
FIG. 1 is a schematic diagram illustrating the prior art signal comparing circuit described above.

For this reason, signal comparing circuits such as that illustrated in the figure labeled "PRIOR ART" have been proposed. Such circuits use a differential amplifier for comparing signals received by two antennas and detecting the higher one and, to cope with spurious switching, are provided with a hysteresis circuit. The hysteresis circuit provides a "dead zone" in which a change in relative signal level will not change the detection output. Thus, in an FM receiver, the amount of audible switching noise is reduced and, in the case of a television receiver, noise and synchronization disturbances are reduced.

In the illustrated prior art signal comparing circuit 3, a differential amplifier 1 is supplied at its non-inverting input terminal with a first input circuit signal $V_1$ applied to a first terminal $t_1$ from a first antenna (not shown) through an input resistor $R_1$ and at its inverting input terminal with a second circuit input signal $V_2$ applied to a second terminal $t_2$ from a second antenna (not shown). The amplifier output and the non-inverting input terminal are connected by a hysteresis circuit 2 having a feedback resistor $R_2$. A power source 4 is also connected to the terminal $t_1$ together with a signal source 5.

Now, assume that the amplifier input voltages $V_{IN1}$ and $V_{IN2}$ to the differential amplifier 1, derived from the circuit input signals $V_1$ and $V_2$, satisfy the condition $V_{IN2} < V_{IN1}$. Then, at the output of the differential amplifier 1 the higher level output voltage $V_H$ appears as the detection output $V_0$. The non-inverting amplifier input is therefore applied with the bias $$\frac{R_1}{R_1 + R_2} V_H$$

through the hysteresis circuit 2 and $$V_{IN1} = \frac{R_2}{R_1 + R_2} V_1 + \frac{R_1}{R_1 + R_2} V_H$$

is established. If the second input voltage $V_2$ is then increased until $V_{IN2} > V_{IN1}$ is established, the detection output $V_0$ appearing at the output of the differential amplifier 1 is changed to the lower level voltage $V_L$. The non-inverting input terminal is then applied with the bias $$\frac{R_1}{R_1 + R_2} V_L$$

through the hysteresis circuit 2 and $$V_{IN1} = \frac{R_2}{R_1 + R_2} V_1 + \frac{R_1}{R_1 + R_2} V_L.$$

Now, if the circuit input voltage $V_2$ is again lowered until $V_{IN2} < V_{IN1}$, $V_{IN1}$ will return to its other level, as described above.

Accordingly, the level of the circuit input signal $V_2$ will increase or decrease as compared with that of the circuit input signal $V_1$, but the amplifier output changes only when $V_{IN1}$ and $V_{IN2}$ change relative to each other. Thus, a relative level range between the input signals $V_1$ and $V_2$ is provided within which the amplifier output will not change and that range, defined as the circuit "hysteresis width" $V_{TH}$, is given as:

$$V_{TH} = \frac{R_1}{R_1 + R_2} (V_H - V_L) \quad (1)$$

The equation (1) shows that, in the prior art signal comparing circuit 3, the hysteresis width $V_{TH}$ is constant regardless of the fluctuation of the circuit input signal levels ($V_1$ and $V_2$).

However, a constant hysteresis width $V_{TH}$ has a significant shortcoming. Relative signal strength can fluctuate enough to cause switching of the output level even though the same signal should be fed to the receiver. For example, an FM signal transmitted from a transmitter contains a residual AM component. And, in the receiver, the center frequency can deviate and, under certain circumstances, the AM component can be mixed into the FM signal. In addition, the amplitude of the undesired AM components is proportional to the signal level. Thus, if the hysteresis width or dead zone is constant regardless of circuit input signal level, spurious switching of the differential amplifier can occur.

OBJECTS AND SUMMARY OF THE INVENTION

Accordingly, it is an object of the present invention to provide a signal comparing circuit capable of obviating the aforesaid defects inherent in prior art signal comparing circuits.

Another object of the present invention is to provide a signal comparing circuit that has an optimum hysteresis width by varying the hysteresis width in response to the input signal level.

According to an aspect of the present invention, a signal comparing circuit comprises comparing means for providing an output signal at a level dependent on the relative levels of a plurality of input signals and a hysteresis circuit for providing a hysteresis width defining a range of relative levels of the compared signals within which the level of the output signal remains unchanged, the hysteresis circuit including a variable gain attenuator circuit for adjusting the hysteresis width in response to the level of at least one of the input signals.

Other objects, features and advantages of the present invention will become apparent from the following detailed description of illustrated embodiments of the invention taken in conjunction with the accompanying drawings.

DETAILED DESCRIPTION OF ILLUSTRATIVE EMBODIMENTS

Figure 2:
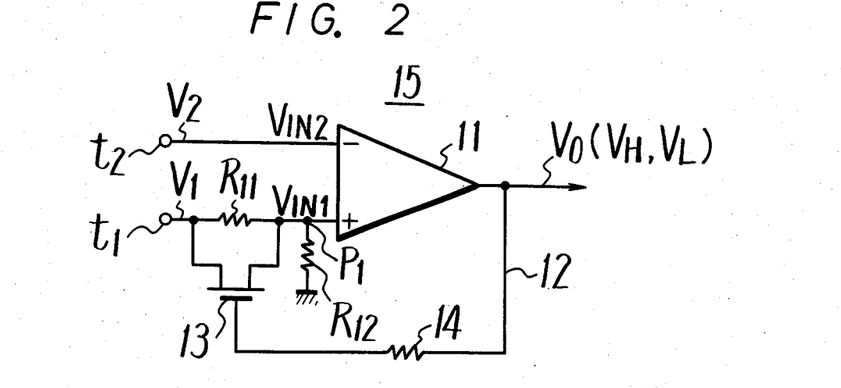
FIG. 2 is a schematic diagram of one embodiment of a signal comparing circuit according to the present invention.
Figure 3:
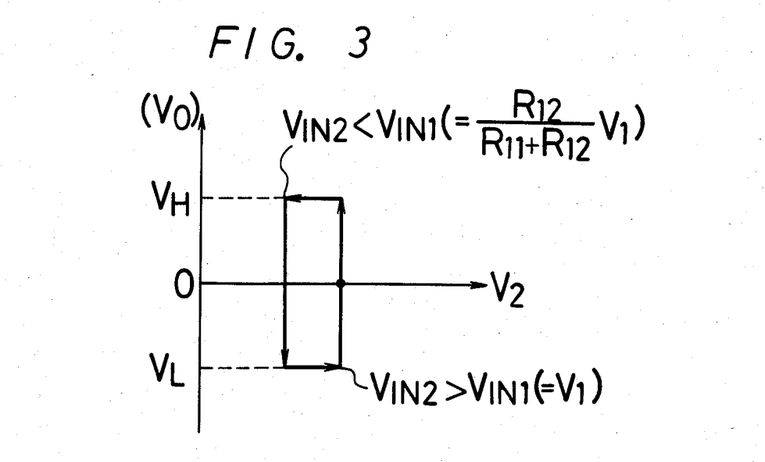
FIG. 3 is a graph indicating the hysteresis characteristics of the signal comparing circuit in FIG. 2.

FIG. 2 shows a basic embodiment of a signal comparing circuit according to the present invention. A differential amplifier 11 has a hysteresis circuit 12 connected between its output terminal and its non-inverting input terminal. An input circuit path comprises an input resistor $R_{11}$ connected to the non-inverting input terminal of the differential amplifier 11, a ground resistor $R_{12}$ one end of which is connected to a connection point $P_1$ between the input resistor $R_{11}$ and the non-inverting input terminal of the differential amplifier 11 and the other end of which is grounded, and a bypass switching path 13 including a switching means such as an FET (field effect transistor) connected in parallel with the input resistor $R_{11}$. The FET 13 is supplied at its gate with the detection output $V_0$ from the differential amplifier 11 through a resistor 14. The FET 13 is thereby turned on when the amplifier output $V_0$ is, for example, a positive voltage $V_H$ and turned off when it is a negative voltage $V_L$. The signal comparing circuit 15 thus comprises a hysteresis circuit in which the amplifier input signal $V_{IN1}$ changes levels, and the difference between such levels depends on the circuit input level $V_1$. The hysteresis width thus depends on the circuit input level $V_1$, as shown by the following discussion.

In the circuitry of FIG. 2, when the input signal $V_1$ from the first input terminal $t_1$ and the input signal $V_2$ from the second input terminal $t_2$ satisfy the condition $V_2 < V_1$, and the amplifier input voltages $V_{IN1}$ and $V_{IN2}$ satisfy the condition $V_{IN2} < V_{IN1}$, the voltage $V_H$ appears at the output of the differential amplifier 11. The FET 13 is thus turned on and the input voltage $V_{IN1}$ to the non-inverting input terminal of the differential amplifier 11 becomes:

$$V_{IN1} = V_1 \tag{2}$$

Then, when the input signal $V_2$ becomes sufficiently larger than the input signal $V_1$ to cause $V_{IN2} > V_{IN1}$ to be established, the differential amplifier 11 is inverted and the voltage $V_L$ appears at its output. At that time, the FET 13 is turned off and the first circuit input signal $V_1$ is divided by the resistors $R_{11}$ and $R_{12}$. Thus, the input voltage $V_{IN1}$ to the non-inverting input terminal becomes:

$$V_{IN1} = \frac{R_{12}}{R_{11} + R_{12}} V_1 \tag{3}$$

Then, when the input signal $V_2$ decreases sufficiently to cause $V_{IN2} < V_{IN1}$ again, the differential amplifier 11 is inverted and the higher level output voltage $V_H$ appears at its output terminal. From the equations (2) and (3), the hysteresis width $V_{TH}$ can be expressed as follows:

$$V_{TH} = \left(1 - \frac{R_{12}}{R_{11} + R_{12}}\right) V_1 \tag{4}$$

Equation (4) shows that the hysteresis width $V_{TH}$ depends on the level of the circuit input signal $V_1$ and thus changes if the level of the input signal $V_1$ fluctuates. Consequently, even if the level of the circuit input signals $V_1$ and $V_2$ fluctuates the signal comparing circuit 15 can provide an optimum hysteresis width.

As described above, the signal comparing circuit 15 shown in FIG. 2 employs the output $V_0$ from the differential amplifier 11 to switch the gain of the variable gain attenuator circuit of the present invention whereby to obtain a hysteresis width $V_{TH}$ that changes in response to fluctuations of the signal level of the circuit input signal.

In the embodiment of FIG. 2, since a dividing means comprising the resistors $R_{11}$ and $R_{12}$ is connected to the non-inverting input terminal of the differential amplifier 11, while no resistance is connected to the inverting input terminal thereof, the sensitivities of the circuit to the input signal levels $V_1$ and $V_2$ may not be matched. The sensitivities of the signal comparing circuit can be substantially matched as shown in FIG. 4, in which a series resistor $R_{13}$ and a grounding resistor $R_{14}$ comprise sensitivity matching means connected to the inverting input terminal of the differential amplifier 11.

Figure 4:
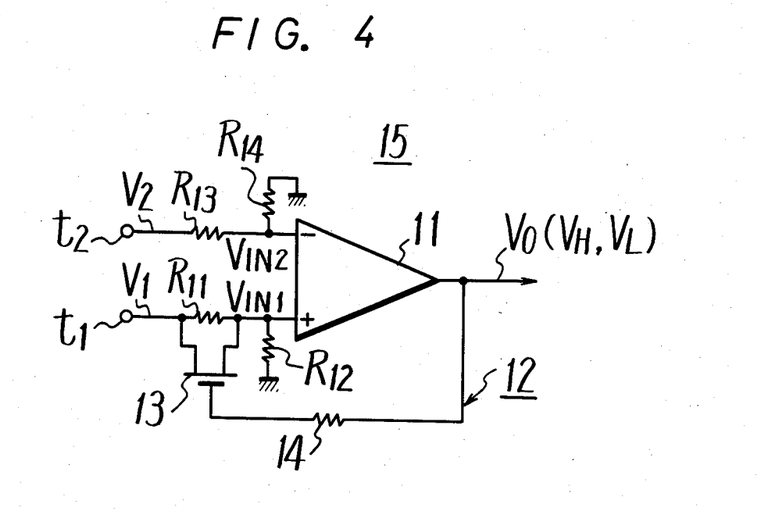
FIGS. 4, 5, 7, 8, 9 and 10 are schematic diagrams showing further embodiments of a signal comparing circuit according to the present invention.

In the signal comparing circuits 15 shown in FIGS. 2 and 4, reducing the level of the input signal $V_1$ reduces the hysteresis width $V_{TH}$ and, when $V_1$ approaches zero, the hysteresis width $V_{TH}$ becomes very small, eventually reaching zero when $V_1=0$. Noise in an FM signal wave is negligible when the input signal level is large. However, if the input signal level is small, noise in the broadcast and noise from the receiver circuit are increased. Accordingly, if the hysteresis width is too small, such noise can cause the differential amplifier 11 to be easily switched.

Figure 5:
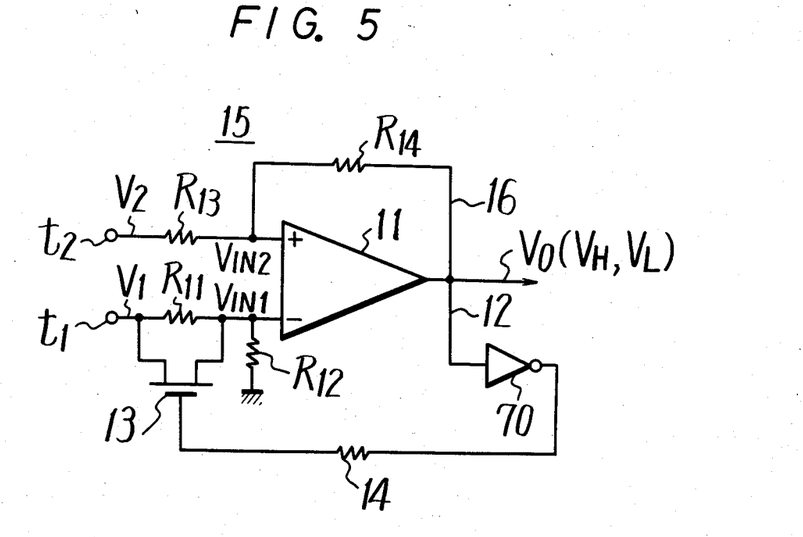

To provide a minimum hysteresis width, the embodiment of a signal comparing circuit according to this invention shown in FIG. 5 can be used. It has a hysteresis width that changes in proportion to the level of the circuit input signal and also a fixed, minimum hysteresis width to prevent spurious switching caused by noise when the circuit input signal level is feeble.

In FIG. 5, the input terminal $t_1$ is connected through the input resistor $R_{11}$ to the inverting input terminal of the differential amplifier 11. The signal comparing circuit comprises an inverter 70 that inverts the levels of the amplifier output. The inverter output operates the switching circuit FET 13 in the same way as the amplifier output in the embodiment in FIG. 2. The input terminal $t_2$ is connected to the non-inverting input terminal of the differential amplifier 11 through the resistor $R_{13}$. Between the non-inverting input terminal and output terminal of the differential amplifier 11 is connected a dependent-gain hysteresis circuit comprising a feedback path having the feedback resistance established by the resistors $R_{13}$ and $R_{14}$.

With this circuitry, when the input voltage $V_2$ is sufficiently larger than the input voltage $V_1$ so that $V_{IN2} > V_{IN1}$, the output voltage $V_0$ assumes the higher voltage level $V_H$, and the following relationships are established:

$$V_{IN2} = \frac{R_{14}}{R_{13} + R_{14}} V_2 + \frac{R_{13}}{R_{13} + R_{14}} V_H \quad (5a)$$

$$V_{IN1} = \frac{R_{12}}{R_{11} + R_{12}} V_1 \quad (5b)$$

Then, when the input voltage $V_1$ is raised so that $V_{IN2} = V_{IN1}$, the level of this circuit input voltage is:

$$V_1' = \left( \frac{R_{14}}{R_{13} + R_{14}} V_2 + \frac{R_{13}}{R_{13} + R_{14}} VH \right) \frac{R_{11} + R_{12}}{R_{12}} \quad (6)$$

When the input voltage $V_1$ becomes sufficiently larger than the input voltage $V_2$ so that $V_{IN2} < V_{IN1}$, the output voltage $V_0$ becomes the lower voltage level $V_L$ and the following relationships are established $$V_{IN2} = \frac{R_{14}}{R_{13} + R_{14}} V_2 + \frac{R_{13}}{R_{13} + R_{14}} V_L \quad (7a)$$

$$V_{IN1} = V_1 \quad (7b)$$

Then, when the input voltage $V_1$ is lowered under those circumstances so that $V_{IN2} = V_{IN1}$ the level of this circuit input voltage is:

$$V_1'' = \frac{R_{14}}{R_{13} + R_{14}} V_2 + \frac{R_{13}}{R_{13} + R_{14}} V_L \quad (8)$$

Therefore, the hysteresis width $V_{TH} = V_1' - V_1''$ is expressed:

$$V_{TH} = \left\{ \frac{R_{14}(R_{11} + R_{12})}{R_{12}(R_{13} + R_{14})} - \frac{R_{14}}{R_{13} + R_{14}} \right\} V_2 + \quad (9)$$

$$\frac{R_{13}(R_{11} + R_{12})}{R_{12}(R_{13} + R_{14})} V_H - \frac{R_{13}}{R_{13} + R_{14}} V_L$$

In equation (9), since factors other than $V_2$ are fixed and will be determined when the circuit is designed, the hysteresis width $V_{TH}$, when $V_2$ is near zero, will have the fixed minimum width:

$$\frac{R_{13}(R_{11} + R_{12})}{R_{12}(R_{13} + R_{14})} V_H - \frac{R_{13}}{R_{13} + R_{14}} V_L \quad (10)$$

And, when the input voltage $V_2$ increases, the hysteresis width $V_{TH}$ will depend on the circuit input voltage $V_2$.

It will be appreciated from the equation (5b) and (7b) that the difference in the levels of $V_{IN1}$ when the output voltage changes levels depends on the level $V_1$ of the first circuit input signal, as in the embodiment of the invention shown in FIG. 2. The difference in the levels of the $V_{IN2}$ is independent of the level $V_2$ of the second circuit input signal (compare equations (5a) and (7a)), similar to the prior art circuit (see equation (1)). Thus, the signal comparing circuit in FIG. 5 has a hysteresis width with a fixed, minimum component that depends on the difference in the levels $V_H$ and $V_L$ of the output signals and a variable component that depends on the input signal level.

Figure 6:
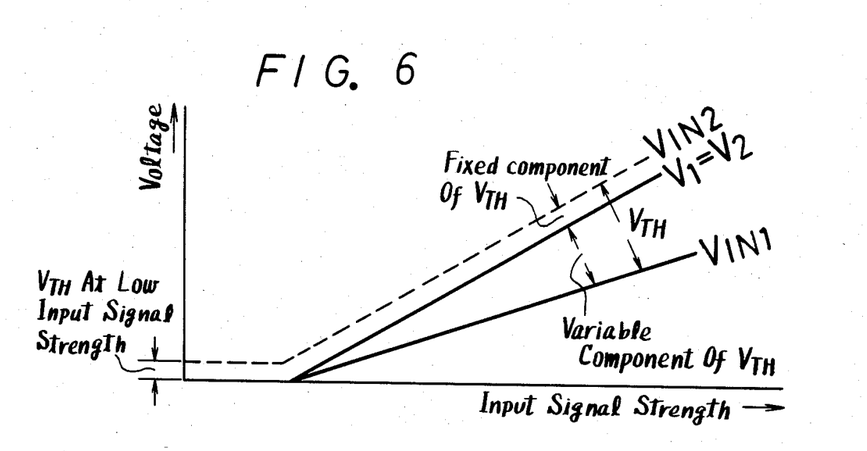
FIG. 6 is a graph indicating the hysteresis characteristics (voltage vs. input signal strength) in the embodiment of the present invention in FIG. 5.

The hysteresis width characteristics of the signal comparing circuit shown in FIG. 5 are illustrated graphically in FIG. 6.

Figure 7:
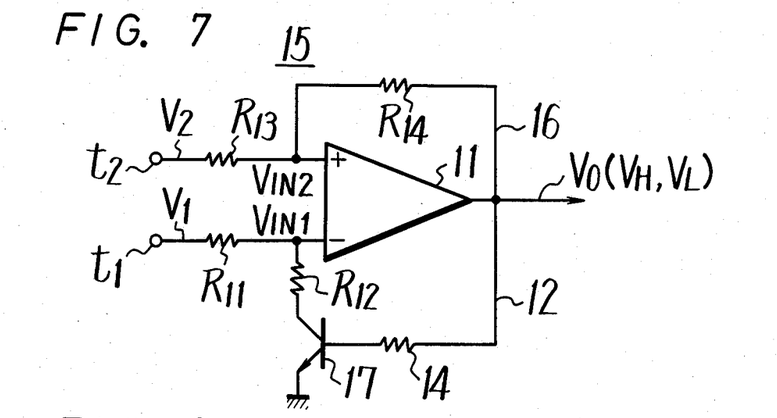

In the aforenoted embodiments, the bypass switching path is provided in parallel to the input resistor $R_{11}$. It is also possible to provide a ground switching path connected in series with the ground resistor $R_{12}$, as shown in FIG. 7. With this embodiment, if the switching means 17 is turned on when the output $V_0$ from the differential amplifier 11 assumes a voltage level $V_H$ and off when the output $V_0$ is $V_L$, just as in FIG. 5, a signal comparing circuit can be established which has a hysteresis width $V_{TH}$ that changes in response to the fluctuation of the level of the circuit input signal, similar to FIG. 5.

In the above-described embodiments, the level of the output $V_0$ from the differential amplifier 11 has two levels, one a positive and the other a negative voltage. When the voltage output assumes zero and positive (or negative) voltages, the circuit embodiments shown in FIGS. 8 and 9 can be employed with the same effect.

Figure 8:
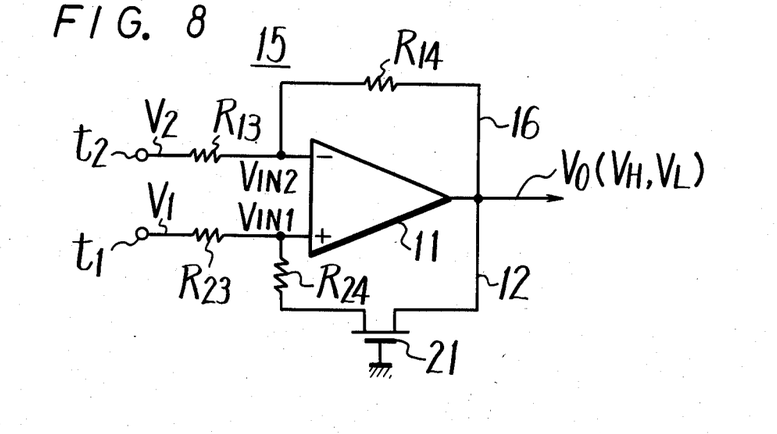

In the signal comparing circuit 15 in FIG. 8, an input resistor $R_{23}$ is connected to the non-inverting input terminal of the differential amplifier 11 and to a feedback resistor $R_{24}$. The feedback resistor $R_{24}$ is connected to the output terminal of the differential amplifier 11 in a feedback path comprising an FET 21 having its gate grounded.

With this circuitry, when the output $V_0$ from the differential amplifier 11 is zero, or at ground level, the FET switching circuit 21 is turned on to permit the input voltage $V_{IN1}$, which has a value that results from dividing the circuit input signal level $V_1$ by the input resistor $R_{23}$ and the feedback resistor $R_{24}$, to be supplied to the non-inverting input terminal of the differential amplifier 11. When the output $V_0$ from the differential amplifier 11 is positive, the switching circuit 21 is turned off to supply the circuit input signal $V_1$ directly supplied to the non-inverting input terminal of the amplifier. Thus, the signal comparing circuit has a hysteresis width the same as that of the circuit in FIG. 5, and the power source can be a single power source (in this case, of course, the input voltage $V_1$ must be greater than the pinch-off voltage of the FET 21.)

Figure 9:
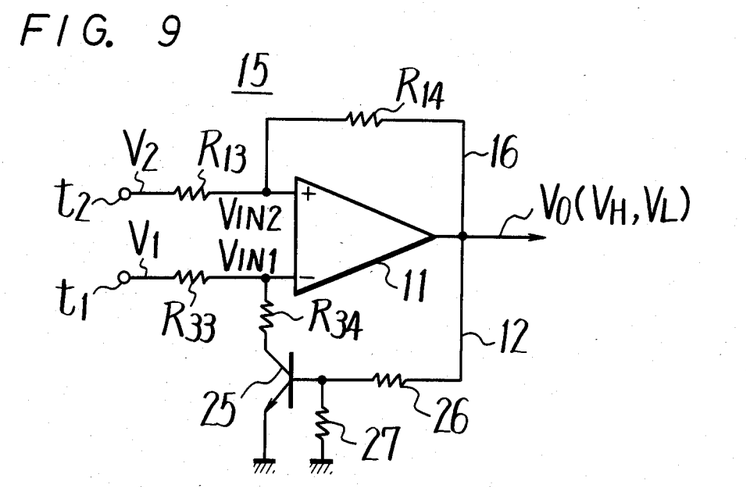

In the signal comparing circuit in FIG. 9, an input resistor $R_{33}$ and a ground resistor $R_{34}$ are connected to the differential amplifier 11 at its inverting input terminal. The ground resistor $R_{34}$ is grounded through a bipolar transistor 25. The base of the transistor 25 is supplied with the output of the amplifier divided by a voltage dividing circuit formed of resistors 26 and 27 connected between the output terminal of the differential amplifier 11 and the ground.

With this circuitry, when the output $V_0$ from the differential amplifier 11 takes a positive value (for example, the level of the power source voltage of the differential amplifier 11), the switching circuit 25 is turned on and the input voltage $V_{IN1}$, which results from dividing the input signal $V_1$ by the resistors $R_{33}$ and $R_{34}$, is fed to the inverting input terminal of the differential amplifier 11. When the output $V_0$ from the differential amplifier 11 has a value near zero, the transistor 25 is turned off and the input signal $V_1$ is supplied to the inverting input terminal of the differential amplifier 11. Accordingly, the signal comparing circuit performs in the same way as the embodiment shown in FIG. 5 and a single power source is sufficient.

While in the above embodiments the hysteresis width changes in response to the change of the level of one of the input signals $V_1$ and $V_2$, the hysteresis width can be made to change in response to changes in the levels of both circuit input signals as follows.

Figure 10:
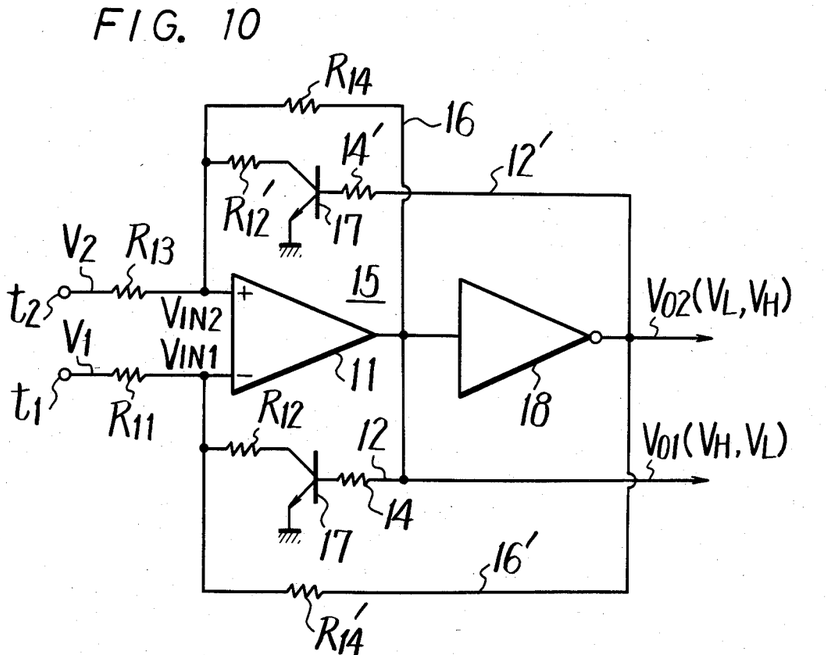

In FIG. 10, two hysteresis circuits like that shown in FIG. 7 are provided with an inverter 18.

With this circuitry, if $V_{01}=V_H$ and $V_{02}=V_L$, the input voltages $V_{IN2}$ and $V_{IN1}$ are expressed as follows:

$$V_{IN2} = \frac{R_{14}}{R_{13}+R_{14}} V_2 + \frac{R_{13}}{R_{13}+R_{14}} V_H \tag{11a}$$

$$V_{IN1} = \frac{R_{12}/R_{14}'}{R_{11}+R_{12}/R_{14}'} V_1 + \frac{R_{12}/R_{11}}{R_{14}'+R_{12}/R_{11}} V_L \tag{11b}$$

If $V_1$ becomes $V_1'$ upon switching ($V_{IN1}=V_{IN2}$):

$$V_1' = \left( \frac{R_{14}}{R_{13}+R_{14}} V_2 + \frac{R_{13}}{R_{13}+R_{14}} V_H - \right. \tag{12}$$

$$\left. \frac{R_{12}/R_{11}}{R_{14}'+R_{12}/R_{11}} V_L \right) \frac{R_{11}+R_{12}/R_{14}'}{R_{12}/R_{14}'}$$

$$V_1' = A \cdot D \cdot V_2 + B \cdot D \cdot V_H - C \cdot D \cdot V_L \tag{13}$$

where $$A = \frac{R_{14}}{R_{13}+R_{14}} \tag{13a}$$

$$B = \frac{R_{13}}{R_{13}+R_{14}} \tag{13b}$$

-continued $$C = \frac{R_{12}/R_{11}}{R_{14}'+R_{12}/R_{11}} \tag{13c}$$

$$D = \frac{R_{11}+R_{12}/R_{14}'}{R_{12}/R_{14}'} \tag{13d}$$

If $V_{01}=V_L$ and $V_{02}=V_H$ are established, then $$V_{IN2} = \frac{R_{12}'/R_{14}}{R_{13}+R_{12}'/R_{14}} V_2 + \frac{R_{12}'/R_{13}}{R_{14}+R_{12}'/R_{13}} V_L \tag{14a}$$

$$V_{IN1} = \frac{R_{14}'}{R_{14}'+R_{11}} V_1 + \frac{R_{11}}{R_{14}'+R_{11}} V_H \tag{14b}$$

$V_1=V_1''$ upon switching is given by:

$$V_1'' = \left( \frac{R_{12}'/R_{14}}{R_{13}+R_{12}'/R_{14}} V_2 + \frac{R_{12}'/R_{13}}{R_{14}+R_{12}'/R_{13}} V_L - \right. \tag{15}$$

$$\left. \frac{R_{11}}{R_{14}'+R_{11}} V_H \right) \frac{R_{14}'+R_{11}}{R_{14}'}$$

$$V_1'' = E \cdot H \cdot V_2 + F \cdot H \cdot V_L - G \cdot H \cdot V_H \tag{16}$$

where $$E = \frac{R_{12}'/R_{14}}{R_{13}+R_{12}'/R_{14}} \tag{16a}$$

$$F = \frac{R_{12}'/R_{13}}{R_{14}+R_{12}'/R_{13}} V_L \tag{16b}$$

$$G = \frac{R_{11}}{R_{14}'+R_{11}} \tag{16c}$$

$$H = \frac{R_{14}'+R_{11}}{R_{14}'} \tag{16d}$$

Thus, the hysteresis width $V_{TH}$ of this circuit is expressed as:

$$V_{TH}=(A \cdot D-E \cdot H)V_2+(B \cdot D+G \cdot H)V_H-(C \cdot D+F \cdot H)V_L \tag{17}$$

In equation (17) all factors other than $V_2$ are determined by the circuit design and the circuit according to this invention shown in FIG. 10 has a substantially fixed hysteresis width $(B \cdot D+G \cdot H)V_H-(C \cdot D+F \cdot H)V_L$ when $V_2$ is near zero, while it has a hysteresis width dependent on the $V_2$ when $V_2$ is greater than zero. Although the equation (17) was derived for the inverting input terminal side of the differential amplifier 11, it is to be appreciated that the same equation can similarly be established as viewed from the non-inverting input terminal side thereof. The levels of both amplifier inputs will depend on the respective circuit input level.

If the influence of noise is low when the circuit input signal level is low, it may be possible that in the embodiments shown in FIGS. 5, 7, 8 and 9 the terminal $t_2$ can be directly connected to the input terminal of the differential amplifier 11 and thus the dependent-gain hysteresis circuit can be eliminated. Similarly, if the influence of noise can be disregarded, it may be possible that in the circuit in FIG. 10, the terminal $t_2$ can directly connected to one input terminal of the differential amplifier 11 and thus the dependent-gain hysteresis circuits 16 and 16' can be eliminated.

Figure 11:
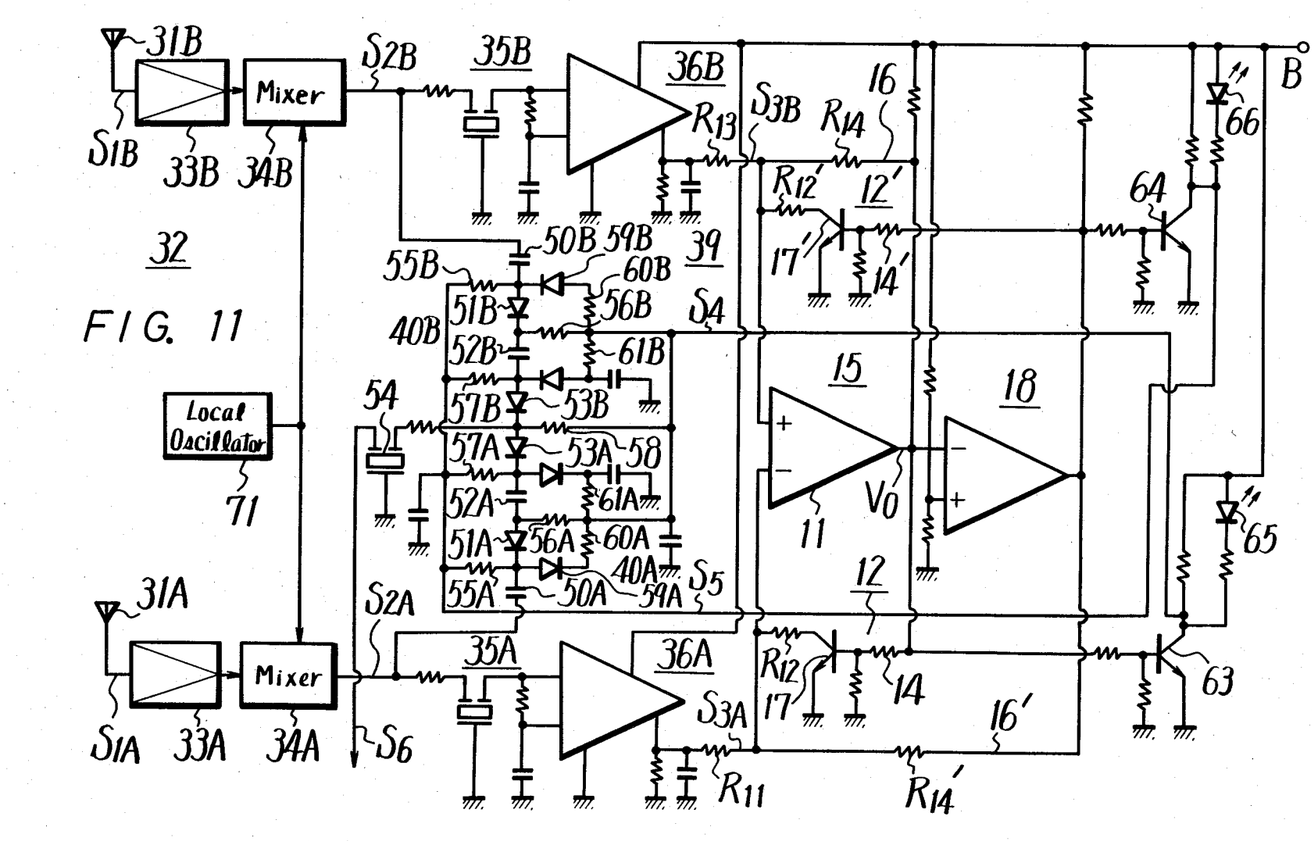
FIG. 11 is a schematic diagram showing a diversity receiver including a signal comparing circuit according to the embodiment of the present invention in FIG. 10.

The signal comparing circuit according to the present invention is suitable for application in a diversity receiving system. FIG. 11 shows a diversity receiving system in which a signal comparing circuit like that shown in FIG. 10 is employed.

In FIG. 11, reference numberals 31A and 31B denote a pair of antennas mounted separately to the front and rear of a vehicle such as an automobile. Respective signals $S_{1A}$ and $S_{1B}$ received thereby are applied to a receiver front end 32. In the front end 32, the signals $S_{1A}$ and $S_{1B}$ are respectively received by high frequency amplifying circuits 33A and 33B and then mixed in mixing circuits 34A and 34B with the output from an oscillator 71, respectively. Thus, intermediate signals $S_{2A}$ and $S_{2B}$ are supplied through filters 35A and 35B to level detecting circuits 36A and 36B.

The level detecting circuits 36A and 36B thus detect levels of signals containing an AM-modulation signal component, and the output signals $S_{3A}$ and $S_{3B}$ therefrom include an AC component superimposed upon a DC component. These output signals $S_{3A}$ and $S_{3B}$ are supplied to the inverting and non-inverting input terminals of the differential amplifier 11 of a signal comparing circuit 15 through input resistors $R_{11}$ and $R_{13}$, respectively.

The output $V_0$ from the differential amplifier 11 is supplied through the base-collector path of a transistor 63 to a switching input circuit 39 as its first switching control signal $S_4$. The output $V_0$ is also supplied through an inverter 18 and the base-collector path of a transistor 64 to the switching input circuit 39 as its second switching control signal $S_5$. The switching input circuit 39 is operated to select the higher one of the intermediate signals $S_{2A}$ and $S_{2B}$ derived from the mixing circuits 34A and 34B and appearing at the input terminals of the filters 35A and 35B and deliver it to an amplifying circuit (not shown) as output $S_6$. To this end, the switching input circuit 39 includes switching circuit section 40A and 40B for the intermediate signals $S_{2A}$ and $S_{2B}$, respectively.

The switching circuit section 40A includes a first output loop comprising a DC-blocking capacitor 50A, a first diode 51A, a DC-blocking capacitor 52A, a second diode 53A and a filter 54 through which the intermediate signal $S_{2A}$ from the mixer 34A is delivered as the output. In a like fashion, the switching circuit section 40B includes a second output loop comprising a DC-blocking capacitor 50B, a third diode 51B, a DC-blocking capacitor 52B, a fourth diode 53B and the filter 54 through which the intermediate signal $S_{2B}$ from the mixer 34B is delivered as the output. The second and first switching control signals $S_5$ and $S_4$ control the diodes 51A, 53A and 51B, 53B, respectively, in response to the relative levels of the intermediate signals $S_{2A}$ and $S_{2B}$.

When the signal level of the signal $S_{2B}$ associated with the second antenna 31B is higher than that of the signal $S_{2A}$ associated with the first antenna 31A, the detection output $V_0$ from the signal comparing circuit assumes a high level voltage $V_H$ so that the first switching control signal $S_4$ supplied through the transistor 63 becomes logic "L" and the second switching control signal $S_5$ supplied through the inverter 18 and the transistor 64 becomes logic "H". However, the second switching control signal $S_5$ of logic "H" turns "on" the path from the resistor 55B through the third diode 51B and the resistor 56B to the collector of the transistor 63 that provides the first switching control signal $S_4$ at logic "L". Similarly, the second switching control signal $S_5$ of logic "H" turns "on" the path of the resistor 57B, the fourth diode 53B and a resistor 58. Thus, the third and fourth diodes 51B and 53B are turned on to allow the second intermediate signal $S_{2B}$ to be delivered through the second output loop. At that time, since the cathode of the first diode, 51A has applied to it the voltage divided by a resistor 55A, a fifth diode 59A and a resistor 60A and the anode of the first diode 51A is connected through the resistor 56A to the first switching control signal $S_4$ of logic "L", the diode 51A is reverse-biased and the second diode 53A is reverse-biased by the resistor 57A. Consequently, the first intermediate signal $S_{2A}$ is blocked by the first and second diodes 51A and 53A. At that time, the transistor 63 is turned on and a light-emitting diode 65 is thus turned on to indicate that the circuitry is being operated by the signal $S_{2B}$.

However, when the signal level of the signal $S_{2A}$ associated with the first antenna 31A is higher than that of the input signal $S_{2B}$ associated with the second antenna 31B, the first switching control signal $S_4$ becomes logic "H" and the second switching control signal $S_5$ becomes logic "L". Accordingly, the first diode 51A is turned "on" via the resistor 56A, the first diode 51A and the resistor 55A, while the second diode 53A is turned "on" via the path of the resistor 58, the second diode 53A and the resistor 57A. Thus, the first intermediate signal $S_{2A}$ is delivered through the first output loop. At that time, since the anode of the third diode 51B has applied with the voltage divided by a resistor 60B, a sixth diode 59B and the resistor 55B and the cathode of the diode 51B has applied to it the first switching control signal $S_4$ of logic "H" through the resistor 56B, the diode 51B is reverse-biased and the fourth diode 53B is reverse-biased via the resistor 58. Thus, the intermediate signal $S_{2B}$ is blocked by the third and fourth diodes 51B and 53B. At that time, the transistor 64 is turned on to allow a light-emitting diode 66 to be turned on to indicate that the circuitry is being operated by the signal $S_{2A}$.

Therefore, according to the circuit shown in FIG. 11, the intermediate signal, associated with the respective received signal derived from the first or second antenna, which has the better signal strength is automatically selected and then supplied to the receiver. Consequently, when the vehicle enters into a signal field area where a difference appears between the signals $S_{2A}$ and $S_{2B}$, although the signal levels of the received signals and hence of the signals $S_{2A}$ and $S_{2B}$ fluctuate, the hysteresis width of the signal comparing circuit also fluctuates in response to the fluctuation of the signal level.

Therefore, according to this embodiment, it is possible to provide a diversity receiver in which two input signals are compared with each other, and the hysteresis width fluctuates in response to fluctuations in the input signal level and, when the input signal is low, a fixed, minimum hysteresis width is obtained.

Several illustrative embodiments of the invention have been described, but it will be apparent that many modifications and variations can be effected by one skilled in the art without departing from the spirit or scope of the invention, and the scope of the present invention is defined solely by the appended claims.

What is claimed is:

1. A signal comparing circuit comprising:
   comparing means for providing an output signal at a level dependent on the relative levels of a plurality of circuit input signals, said comparing means including a differential amplifier for providing an output signal at one of two levels depending on which of two amplifier input signals has a higher level;
   said amplifier input signals are derived from said respective circuit input signals;
   a hysteresis circuit for providing a hysteresis width defining a range of relative levels of the compared signals within which range the level of the output signal remains unchanged, said hysteresis circuit including a variable gain attenuator circuit for adjusting said hysteresis width in response to at least one of said circuit input signal levels, the gain of said attenuator circuit being changeable between two levels in response to changes in said output signal level to provide at least one of said amplifier input signals at first and second input levels having a difference dependent on the level of said respective circuit input signal; and
   a sensitivity matching circuit for changing the level of said other amplifier input signal thereby to change said hysteresis width.

2. A signal comparing circuit as in claim 1; wherein said sensitivity matching circuit comprises a series resistor between said other circuit input said other amplifier input and and a grounding resistor connected in series between said series resistor and ground.

3. A signal comparing circuit comprising:
   comparing means for providing an output signal at a level dependent on the relative levels of a plurality of input signals, said comparing means including a differential amplifier for providing an output signal at one of two levels depending on which of two amplifier input signals has a higher level;
   said amplifier input signals are derived from respective circuit input signals;
   a hysteresis circuit for providing a hysteresis width defining a range of relative levels of the compared signals within which range the level of the output signal remains unchanged, said hysteresis circuit including a variable gain attenuator circuit for adjusting said hysteresis width in response to at least one of said input signal levels, the gain of said attenuator circuit being changeable between two levels in response to changes in said output signal level to provide at least one of said amplifier input signals at first and second input levels having a difference dependent on the level of said respective circuit input signal; and
   a dependent-gain hysteresis circuit for changing the level of said other amplifier input signal by a predetermined ratio of said amplifier output signal level.

4. A signal comparing circuit as in claim 3; wherein said dependent-gain hysteresis circuit comprises a feedback path connecting said output signal with said other amplifier input signal and said predetermined ratio is provided by at least one resistor.

5. A signal comparing means as in claim 3; further comprising an inverter means for accepting said output signal and inverting the levels thereof; wherein:
   said differential amplifier has a first input for accepting a first amplifier input signal through a first input circuit path and a second input for accepting a second amplifier input signal through a second input circuit path;
   said attenuation circuit includes a first attenuation path between the output of said differential amplifier and said first input circuit path having a changeable gain for changing the level of said first amplifier input signal in response to changes in said amplifier output signal level to provide said first amplifier input signal at first and second levels having a difference dependent on the level of said first circuit input signal and a second attenuation path between the output of said inverter and said second input circuit path having a changeable gain for changing the level of said second amplifier input signal in response to changes in said inverter output signal level to provide said second amplifier input signal at first and second levels having a difference depending on the level of said second circuit input signal;
   said dependent-gain hysteresis circuit comprises a first feedback path between said inverter output and the first input circuit path for changing the level of said first amplifier input signal by a first predetermined ratio of said inverter output signal level and a second feedback path between said amplifier output and the second input circuit path for changing the level of said second signal by a second amplifier input predetermined ratio of said amplifier output signal level.

6. A signal comparing circuit as in claim 5; wherein said amplifier has an inverting input; and wherein:
   said first amplifier input comprises said inverting input of said amplifier;
   said first input circuit path includes a first input resistor and a first ground resistor connected to said first input resistor;
   said first attenuation path comprises a first switching means connected in series with said first ground resistor and ground and operable in response to changes in the level of said amplifier output signal for selectively connecting and disconnecting said first input circuit path to ground;
   said first feedback path comprises a first feedback resistance for determining said first predetermined ratio;
   said second signal path includes a second input resistor and a second ground resistor connected to said second input resistor;
   said second attenuation path comprises a second switching means connected in series with said ground resistor and ground and operable in response to changes in said inverter output signal level for selectively connecting and disconnecting said second input circuit path to ground; and
   said second feedback path comprises a second feedback resistance for determining said second predetermined ratio.

7. A signal receiving means including a signal comparing circuit as in claim 5; further comprising:
   a first antenna for supplying said first circuit input signal with a level dependent on the strength of the signal received by said antenna;
   a second antenna for supplying a second circuit input signal with a level dependent on the strength of the signal received by said second antenna; and
   selecting means responsive to said amplifier and inverter outputs for selecting the antenna receiving a stronger signal.

8. A signal comparing circuit comprising:

comparing means including a differential amplifier receiving two amplifier input signals for providing an output signal at one of two levels depending on which of said two amplifier input signals has a higher level; and a hysteresis circuit for providing a hysteresis width defining a range of relative levels of the compared signals within which range the level of the output signal remains unchanged;

said hysteresis circuit including a variable gain attenuator circuit for adjusting said hysteresis width in response to the level of at least one of said amplifier input signals and having a gain changeable between two levels in response to changes in said output signal level to provide at least one of said amplifier input signals at first and second input levels having a difference dependent on the level of a corresponding circuit input signal;

said variable gain attenuator circuit comprising:

dividing means selectively operable to divide said circuit input signal by first and second amounts, said dividing means including an input resistor selectively connectable into a circuit path for providing said circuit input signal as said amplifier input signal;

said circuit path including said input resistor, a ground resistor connected between said input resistor and ground and a switching path connected in parallel with said input resistor; and switching means including a semiconductor device disposed in said switching path for providing a by-pass switching path and for disconnecting said input resistor from said circuit path when said semiconductor device is made conductive by said output signal and for connecting said input resistor in said circuit path when said semiconductor device is made non-conductive by said output signal.

9. A signal comparing circuit as in claim 8; wherein said amplifier has an inverting input; further comprising an inverter means for accepting said output signal and inverting the levels thereof to provide an inverted output signal; in which said circuit path provides said inverting input of said amplifier; and said semiconductor device is operated by said inverted output signal.

10. A signal comparing circuit comprising:

comparing means including a differential amplifier receiving two amplifier input signals for providing at an output an output signal having one of two levels depending on which of said two amplifier input signals has a higher level; and a hysteresis circuit for providing a hysteresis width defining a range of relative levels of the compared signals within which range the level of the output signal remains unchanged;

said hysteresis circuit including a variable gain attenuator circuit for adjusting said hysteresis width in response to the level of at least one of said amplifier input signals and having a gain changeable between two levels in response to changes in said output signal level to provide at least one of said amplifier input signals at first and second input levels having a difference dependent on the level of a corresponding circuit input signal;

said variable gain attenuator circuit comprising:

dividing means selectively operable to divide said circuit input signal by first and second amounts, said dividing means including a resistance selectively connectable into a circuit path for providing said circuit input signal as said amplifier input signal;

said circuit path including an input resistor and a feedback resistor connected in a feedback circuit path between said circuit path and said output of said differential amplifier; and switching means including a semiconductor device for selectively connecting said resistance into and disconnecting said resistance from said circuit path in response to changes in said output signal level, said semiconductor device being connected in series with said feedback resistor in said feedback circuit path for connecting said feedback resistor into said circuit path when said output signal is at ground level.

* * * * *